Figure 1:
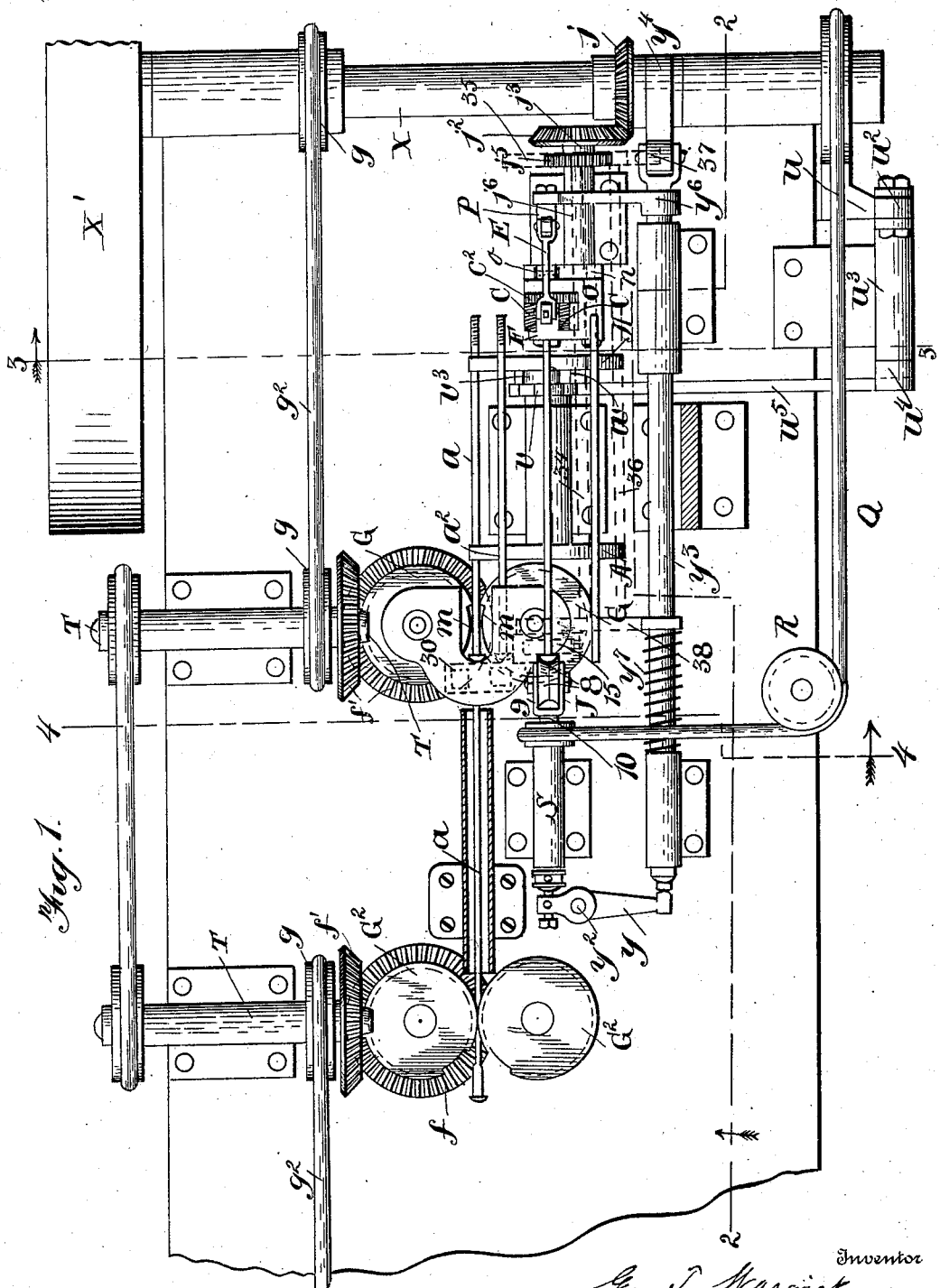

No. 693,342. Patented Feb. 11, 1902.
G. T. WARWICK.
MACHINE FOR MAKING METALLIC SPOKES, &c.
(Application filed May 29, 1899.)
(No Model.) 5 Sheets—Sheet 1.

Witnesses
Geo. E. Frech
M. A. Campbell

Inventor
Geo. T. Warwick,
by Wm. F. Bellins,
Attorney

No. 693,342. Patented Feb. 11, 1902.
G. T. WARWICK.
MACHINE FOR MAKING METALLIC SPOKES, &c.
(Application filed May 29, 1899.)
(No Model.) 5 Sheets—Sheet 2.
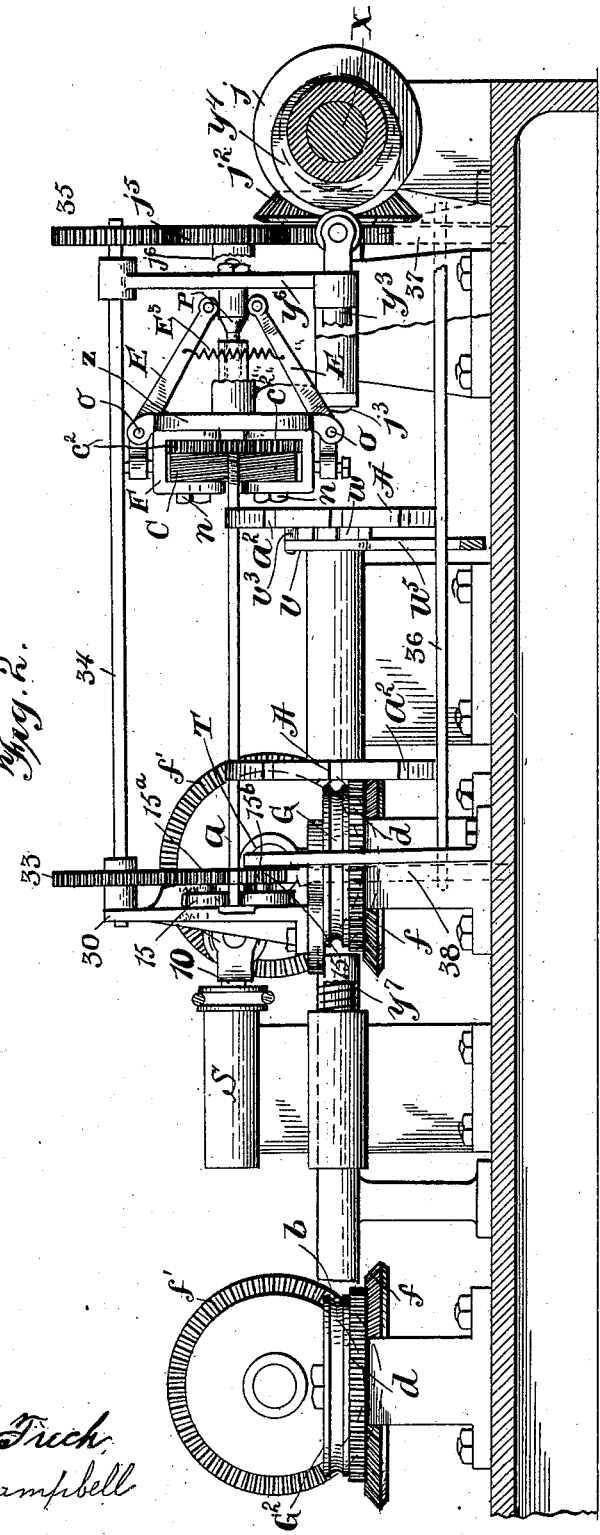
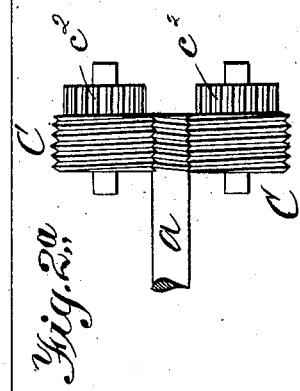

No. 693,342. Patented Feb. 11, 1902.
G. T. WARWICK.
MACHINE FOR MAKING METALLIC SPOKES, &c.
(Application filed May 29, 1899.)
(No Model.) 5 Sheets—Sheet 3.
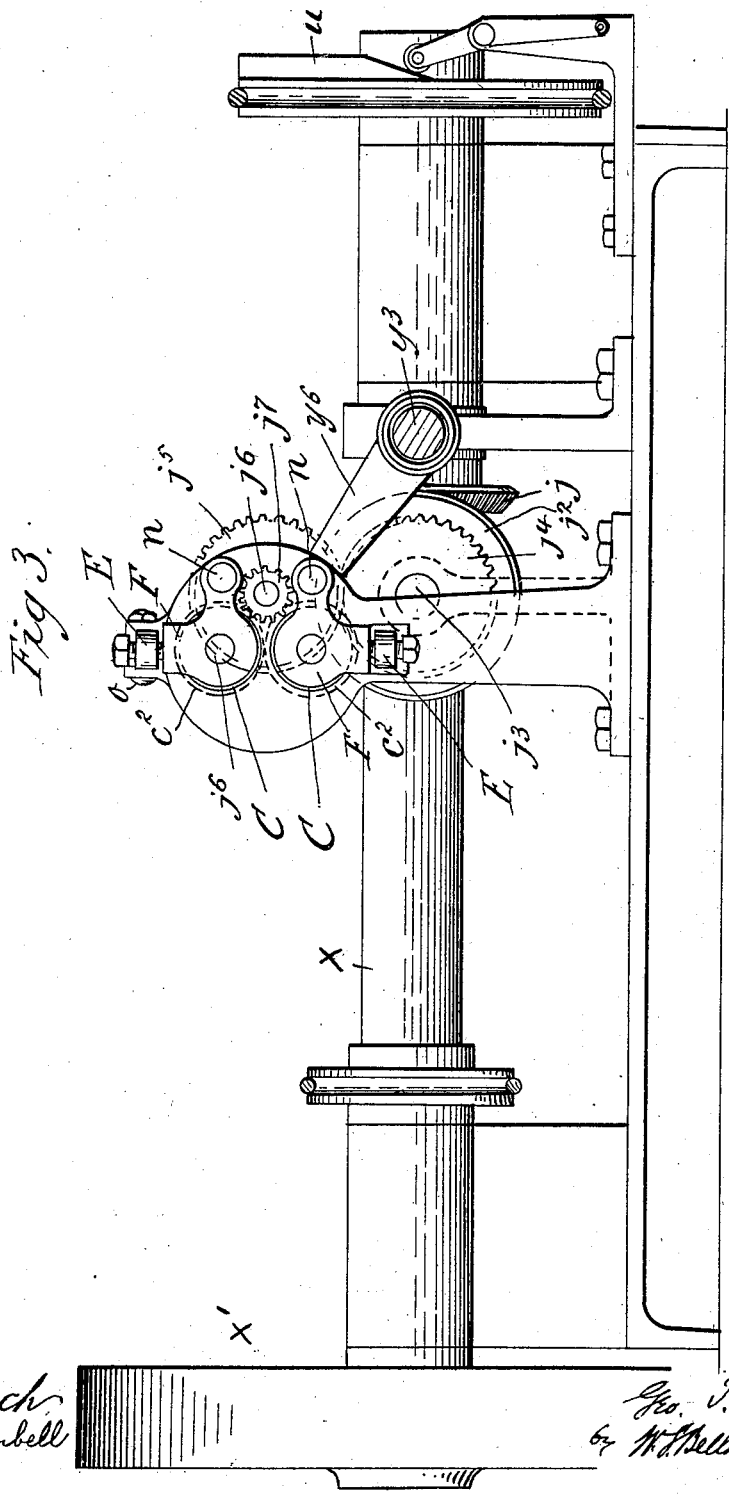

No. 693,342. Patented Feb. 11, 1902.
G. T. WARWICK.
MACHINE FOR MAKING METALLIC SPOKES, &c.
(Application filed May 29, 1899.)
(No Model.) 5 Sheets—Sheet 4.
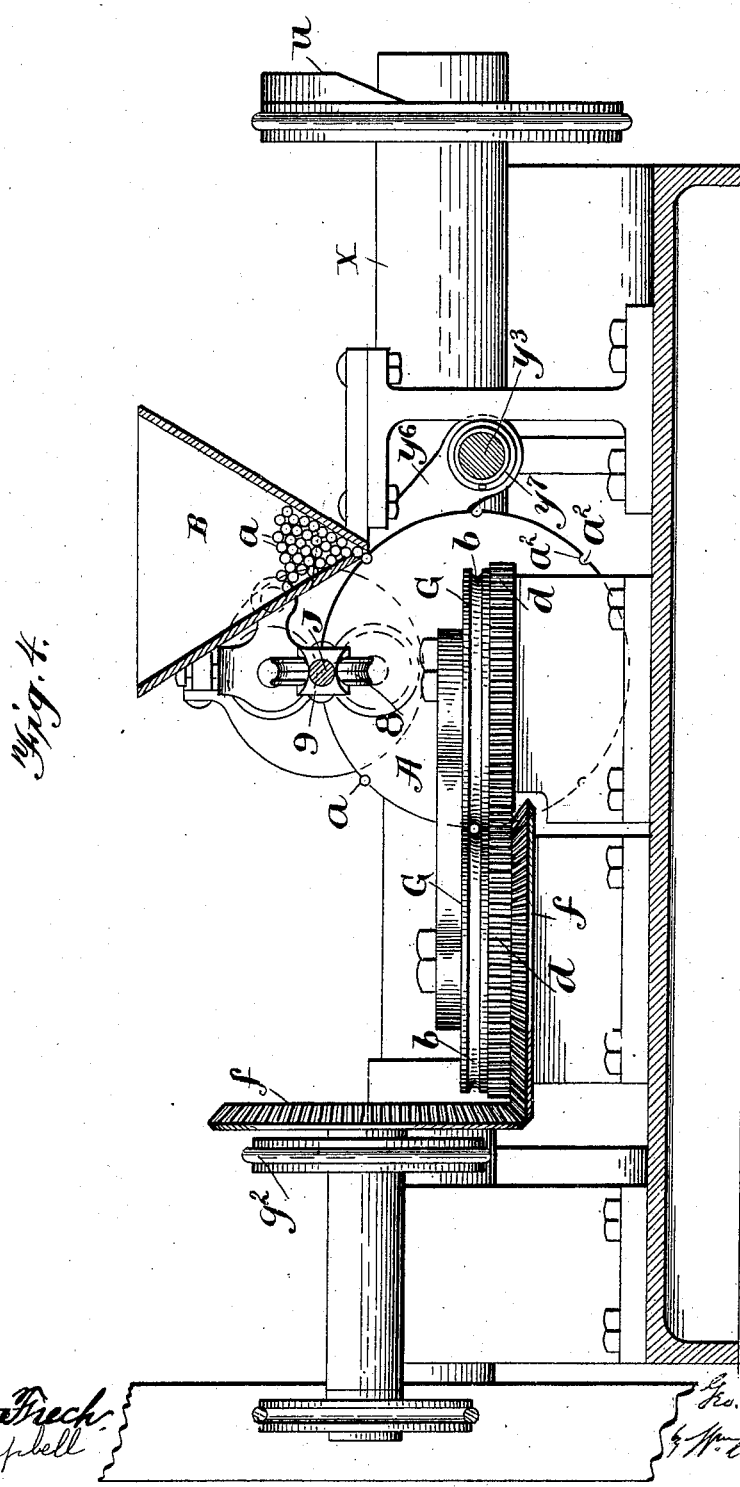

No. 693,342. Patented Feb. 11, 1902.
G. T. WARWICK.
MACHINE FOR MAKING METALLIC SPOKES, &c.
(Application filed May 29, 1899.)
(No Model.) 5 Sheets—Sheet 5.
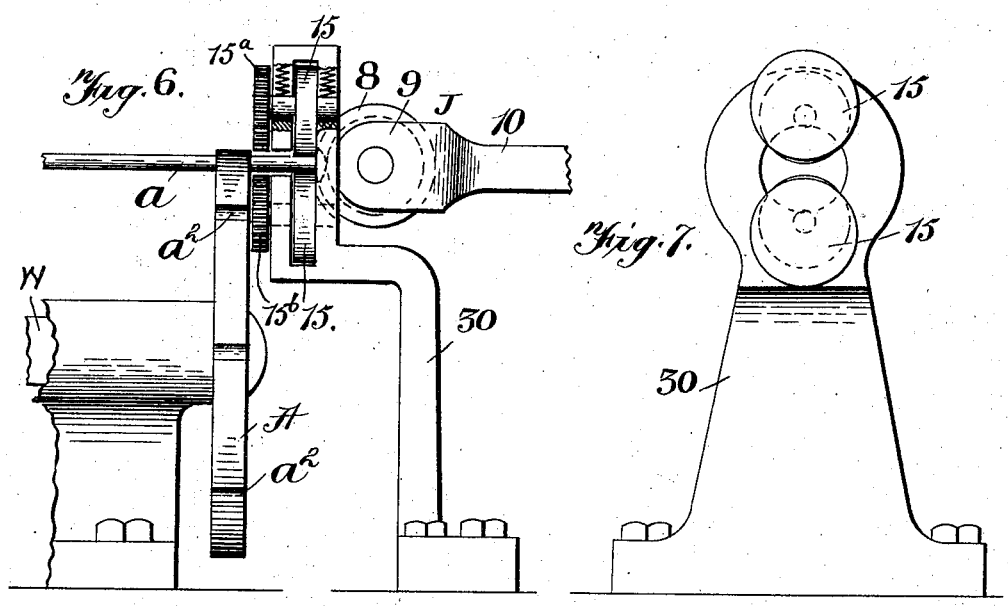
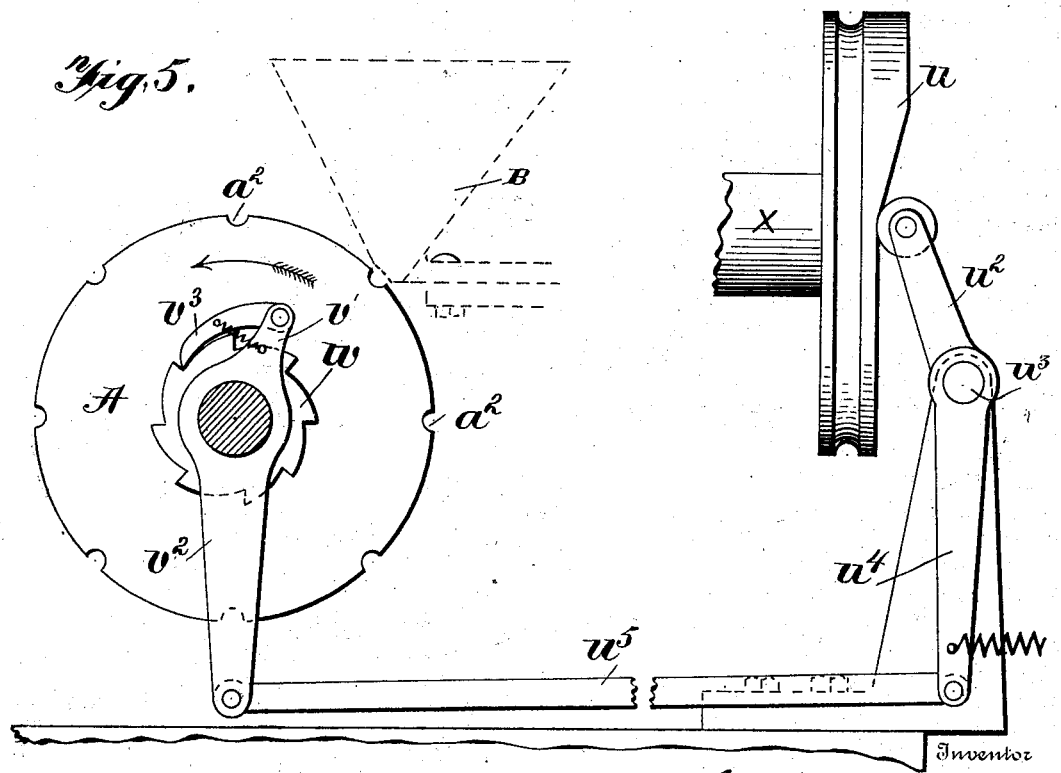
Witnesses
Geo. E. Frech.
M. A. Campbell
Inventor
Geo. T. Warwick
by Wm. J. Bellows
Attorney

UNITED STATES PATENT OFFICE.

GEORGE T. WARWICK, OF SPRINGFIELD, MASSACHUSETTS.

MACHINE FOR MAKING METALLIC SPOKES, &c.

SPECIFICATION forming part of Letters Patent No. 693,342, dated February 11, 1902.

Application filed May 29, 1899. Serial No. 718,781. (No model.)

*To all whom it may concern:*

Be it known that I, GEORGE T. WARWICK, a citizen of the United States of America, and a resident of Springfield, in the county of Hampden and State of Massachusetts, have invented certain new and useful Improvements in Machines for Reducing and Elongating and Screw-Threading Round Metallic Rods or Blanks, of which the following is a full, clear, and exact description.

My invention relates to an improvement in machines for screw-threading, heading, and drawing bicycle-spokes and other articles; and the object of my invention is to produce a mechanism by means of which plain wires are fed from a hopper, headed at one end and threaded at the other, and then passed on to the drawing-rolls, which reduce them to the desired thickness and length without the necessity of any of the wires being handled while being operated upon until it leaves the machine in the shape of a finished spoke or other threaded and headed article.

My invention consists in, first, a hopper in which the wires are placed and a feeding mechanism having an intermittent motion, combined with a heading mechanism at one end of the carrier and a threading mechanism at the other and which are made to operate upon opposite ends of the wire, rod, or blank while it is held by the carrier; second, a feeder or carrier for the wires which has an intermittent motion, a threading mechanism at one end of the carrier and a heading mechanism at the other, which operate upon the wire while upon the carrier, combined with drawing-rolls to which the threaded and headed wires are automatically delivered, by means of which rolls the wire is reduced in thickness and increased in length, and, furthermore, in the arrangement and combination of devices which will be more fully described hereinafter.

In the accompanying drawings, which represent my invention, Figure 1 is a plan view of my machine for threading, heading, and drawing the spokes, the hopper being omitted for the sake of clearness and the mechanism for rotating the blanks while in the carrier therefor and the supports for such mechanism being indicated by dotted lines. Fig. 2 is a vertical sectional view taken upon the dotted lines 2 2 of Fig. 1. Fig. 2$^a$ is a side view of the threading-rolls and of the blank being threaded thereby. Fig. 3 is a partial vertical cross-section taken upon the dotted lines 3 3 of Fig. 1. Fig. 4 is a longitudinal vertical section taken through the hopper and to one side of the drawing mechanism. Fig. 5 is a detail view showing the hopper in dotted lines in connection with the feed-carrier and the mechanism for imparting to it an intermittent motion. Fig. 6 is a detail view showing the hopper and mechanism for causing the wires to revolve to one end of the feed-carrier. Fig. 7 is a detail view of the mechanism for causing the wires to revolve, taken at right angles to Fig. 6.

X represents the driving-shaft, which is provided with a driving-wheel X' at one end.

The rods or wires $a$ which are to be operated upon are placed in the hopper B and from which they are delivered by gravity to the carrier A. This carrier consists of two disks provided with a series of notches $a^2$ in their edges at equal distances apart to receive the rods as they are fed from the hopper, and these disks are united by a suitable shaft W, placed in suitable bearings provided therefor. As the rods are to be both headed and threaded before they leave the carrier, it is necessary to impart to the carrier an intermittent motion, so that when the rods are brought opposite the heading and threading mechanisms the carrier will be held stationary while the rod is being operated upon. For this purpose upon one end of the carrier is formed a ratchet $w$, and journaled upon the shaft W outside of the ratchet $w$ is a lever $v^2$, which has an arm or projection $v'$ at its upper end, to which the spring-actuated pawl $v^3$ is pivoted. This lever $v^2$ is given an intermittent reciprocating movement upon the shaft W, and each time that it is moved the pawl $v^3$ engages with the ratchet $w$ and turns the carrier a regulated distance. To the lower end of the lever $v^2$ is pivoted one end of the connecting-rod $u^5$, and the other end of the rod is pivoted to the lower end of the lever $u^4$, which is fixed to and carried by a shaft $u^3$, which is provided with the fixed arm $u^2$, carrying a friction-roller at its upper end to bear against the cam $u$, secured to the driving-shaft X. At each revolution of the shaft X the cam $u$ causes the carrier to be fed forward. When the carrier is moved, the rod just fed from the hopper is carried to the top of the carrier and one end of the rod moves between the threading mechanism at the same time that the other end is engaged by the header, and while the carrier remains stationary the rod is caused to forcibly revolve by the friction-wheels 15, while the threading and heading mechanisms are engaged upon its opposite ends. The threading of one end of the rod is accomplished by the two threaded rolls or dies C, which have their threads inclined in the proper direction, according as to whether a right or left hand thread is to be produced upon the rod, and this thread is impressed or rolled by the two threading die wheels or rolls in contradistinction to being threaded by a cutting-tool. These two rolls C are journaled in the yokes or frames F, which are movable slightly toward and from the other, as shown more especially in Figs. 2 and 3, and these yokes are to this end pivoted upon the journals $n$, and the inner end of each of these threading wheels or dies is provided with the gear-wheel $c^2$, which meshes with an intermediate gear $j^7$, secured upon the end of the shaft $j^6$, which has secured to its outer end a spur-gear $j^5$, which in turn meshes with the spur-gear $j^4$ upon the shaft $j^3$. The shaft $j^3$ is provided upon its outer end with a bevel-gear $j^2$, which meshes with a bevel-gear $j$ upon the driving-shaft X. The intermediate spur-gear $j^7$ causes the two die-rolls to revolve in the same direction, and as the rod or wire is caused to forcibly revolve while its end is being operated upon by the two rolls a perfect thread is produced. To cause the wheels C to open at the proper time to receive the end of the wire or rod and then open to allow the wire or rod to be carried freely on through by the carrier, each yoke or frame F has mounted for engagement therewith a lever E, which is pivoted at $o$ upon a suitable frame Z and which lever has its inner end drawn forcibly in the proper direction by the spring $E^2$, which provides that the wheels C are normally separated. After the end of the rod has been carried between them by means of the carrier A the cam P, which has a sliding motion, is forced between the inner ends, as shown in Fig. 2, and this causes the levers E to swing upon their pivots and force the frames F, carrying the rolls C, inwardly toward each other, so as to form the thread upon the end of the rod that is being operated upon. The cam P is formed upon the end of the arm $y^6$, which is secured to the carrier bar or plunger $y^3$ and which bar or plunger has imparted to it an endwise movement by means of the cam $y^4$ upon the shaft X, the bar or plunger being provided with a friction-roller upon its end, as shown in Figs. 1 and 2, where it bears against the cam for the purpose of decreasing the friction. As soon as the cam P is forced backward by the spring $y^7$ upon the bar or plunger $y^3$ the spring $E^3$, which connects the levers E, thrust the frames F apart, and the wire or rod is free to be moved forward by the carrier A. At the same time that one end of the rod is engaged by the threading mechanism its opposite end is engaged by the header, which consists of a grooved friction-roller made of two separate parts 8, which are journaled in a suitable frame or bearing 9 upon the end of the shaft 10. These two parts of the grooved roller revolve in opposite directions while the head is being upset and formed, and the shaft 10 receives a rotary motion through the sprocket-chain or belt Q, which is driven by the shaft X and which passes around the guiding-roller R. The two halves of the upsetting-roller 8 turn by their own action, one in one direction and the other in the opposite one at opposite sides of the head, as is well known in rivet-heading machines. The shaft 10 has an endwise movement through its bearing S, so as to alternately engage with and release the end of the rod, and this endwise movement is imparted through the arm or lever $y$, which is pivoted at $y^2$ upon any suitable support, one end of the lever $y$ engaging the shaft 10 and the other being engaged by the bar or plunger $y^3$, which is operated, as already described, by the cam $y^4$. The bar or plunger $y^3$ is provided with a collar, and between the collar and the bearing, near the end of the bar or plunger, is placed the spring $y^5$, which forces the bar or plunger endwise as soon as it is left free to move by the revolution of the cam $y^4$, and this endwise movement of the bar or plunger through the lever $y$ causes the shaft 10, with its upsetting or spinning device J, to move backward from the wire or rod after the head has been formed, and thus leave the rod free to be carried forward by the carrier. When the next rod is presented fresh from the hopper, the cam $y^4$ again acts upon the bar or plunger $y^3$ and forces the upsetting and spinning device J forward, so as to catch the end of the rod and form the head upon it.

In order to perfectly form the head and thread, the wire or rod $a$ being acted upon must have a positive movement, and for this purpose a stand or support 30 is provided at a suitable distance beyond the end of the carrier A, as shown in Figs. 2 and 6, and in the upper portions of this support 30 are mounted the two friction-wheels 15, which are operated by suitable gearing, and which wheels impart to the wire or rod a positive rotary motion of its own, as heretofore explained. The said friction-rolls 15 15 have thereon upper and lower gear-wheels or pinions $15^a$ and $15^b$, not in mesh. With the upper pinion $15^a$ a gear-wheel 33 meshes, the same being carried on a shaft 34, suitably journaled and ranging longitudinally over the machine and having at its end opposite the gear-wheel 33 the gear-wheel 35, in mesh with the aforementioned gear-wheel $j^5$, which is driven by the gear-wheel $j^4$. There is ranging longitudinally adjacent the base of the machine another horizontal shaft 36, suitably journaled, the same being driven through gearing at 37 by the said gear-wheel $j^4$, and this shaft has, through a train of gearing, (indicated at 38,) a driving connection with the friction-roller pinion $15^b$, whereby such pinion $15^b$ for the lower friction-roll is driven. It is expedient to provide the gearing of a somewhat roundabout character, as indicated, in order to leave unobstructed space in front and back of the friction-rolls 15 15 for the free passage to, between, and away from them of the extremity of the revolubly-carried rod or blank to be headed. In the operation of the described mechanism the cam actions are so timed that the threading-rollers engage and by their threading-ribs become embedded in the end portion of the rod before the pressure by the heading mechanism is brought endwise against the opposite end of the rod, and as the pressure is strictly in the length of the rod the latter will have no tendency to buckle or become deflected. Again, it is to be explained that the upsetting action is insured by the comparatively light pressure by the heading device, which, however, has a very rapid rotary motion, and that so soon as the head is but partially formed it, upsetting or becoming shouldered against the face of the friction-rollers 15 15, finds said rollers as an abutment for preventing endwise receding of the rod being worked upon.

After the rod or spoke has been both headed and screw-threaded the carrier moves it forward, so that its headed end is carried between the drawing-rolls G G (shown more especially in Figs. 1 and 4) and which are provided each with the peripheral groove $b$, of less diameter than the wire, rod, or spoke, the same being in a plane perpendicular to the axis of the roll, and which rollers are geared together by the wheels $d$ and which are caused to revolve by the bevel-gear $f$ upon one of the wheels and which meshes with a bevel-gear $f'$ upon a shaft T, mounted in suitable bearings, and which is driven by a belt or sprocket-chain $g^2$ from the shaft X. An opening or recess $m$ is formed at the periphery of each roll, so that the headed end of the bar may be introduced between the rolls, and the semicircular grooves in the rolls together make where the rolls are joined a semicircular pass or opening of less diameter than the original diameter of the bar or blank, so that as the bar is passed through and between the drawing-rolls G by the feeding action of the latter the bar is drawn down for a reduced size, and it may successively pass from the first set of drawing-rolls to a second set $G^2$ of similar rolls of greater diameter to correspond to the elongated bar and having similar passes at their grooved edges. The said opening or recess $m$ provides also that as the rod is fed through the one pair of reducing-rolls to be taken by the next pair the threaded end of the rod last emerging will not be subjected to a crushing or thread-flattening action. Each succeeding set of rolls will be set farther from the preceding pair of drawing-rolls to correspond to the successive elongations of the bar, and each succeeding pair of the drawing-rolls may be driven by sprocket wheel and chain connections on the arbor of one of the driving-gears of the previous pair, and thus a round bar or blank of steel of eight inches may be finally turned out or produced as a bicycle-spoke, headed and threaded and elongated to twelve inches, more or less.

From the above it will be seen that after the wires or rods are emptied into the hopper B they do not need to be handled until they emerge from the machine as finished spokes, every action of the machine being automatic and timed so that one action succeeds the other in regular order.

Having thus described my invention, I claim—

1. A carrier having an intermittent motion, combined with a mechanism for threading a wire or rod, and a second mechanism for heading the rod or wire at the same time that it is being threaded, substantially as shown.

2. A carrier having an intermittent motion, and a mechanism for threading one end of the rod or wire held by the carrier, combined with a heading mechanism, and a mechanism for imparting to the wire a positive rotary motion of its own, substantially as described.

3. A carrier having an intermittent motion, a mechanism for threading one end of the rod or wire carried by the carrier, a mechanism for heading the opposite end of the wire from the one that is being threaded, and a mechanism for imparting to the wire or rod a positive rotary motion of its own, combined with the drawing-rolls to which the headed and threaded wire or rod is delivered by the carrier, substantially as set forth.

4. A carrier having an intermittent motion, a mechanism for threading one end of the rod or wire carried by the carrier, and a mechanism for opening and closing the threading mechanism, a heading mechanism, and a mechanism for imparting to the heading mechanism a reciprocating motion, combined with a separate mechanism for imparting to the rod or wire a positive rotary motion of its own, substantially as specified.

5. A carrier having an intermittent motion, a mechanism for threading the wire or rod carried by the carrier, and a heading mechanism, combined with a mechanism for imparting to the heading mechanism an endwise movement, and a separate mechanism for causing the rod or wire to positively rotate, substantially as shown.

6. The supporting-frame, an oppositely-arranged pair of levers E E pivoted thereon, a spring for drawing the ends of the levers toward each other when left free to move, a cam operating between the adjacent ends of the levers, for separating such ends and causing approaching movements of their opposite ends, and a mechanism for operating the cam, combined with pivotally-mounted yokes or frames which are acted upon by said levers, threading-rolls journaled in the yokes, and mechanism for causing the rolls to revolve in the same direction, substantially as specified.

7. In a machine for heading and threading spokes for a bicycle, a mechanism for causing the rod or wire to positively rotate while it is being operated upon by the heading and threading mechanisms, substantially as described.

8. In a machine for making spokes, an automatic mechanism for feeding blanks, a heading mechanism at one side or end of said feeder, and a threading mechanism at the other, to the threading and heading actions of which the said feeder presents the successive rods or blanks.

9. In a machine for making spokes, an automatic feeding mechanism, a heading mechanism at one side of the feeder and a thread-forming mechanism at the other side combined with a set of drawing and elongating rolls.

10. In a machine for making metallic wheel-spokes, a hopper, a carrier, a heading device, a threading mechanism, and a pair of elongating-rolls, arranged in peripheral proximity and having a space across their working faces and combined for operation, for the purposes set forth.

Signed by me at Springfield, Massachusetts, this 23d day of May, 1899.

GEO. T. WARWICK.

Witnesses:
WM. S. BELLOWS,
M. A. CAMPBELL.